United States Patent
Sehgal et al.

(10) Patent No.: US 6,764,280 B2
(45) Date of Patent: Jul. 20, 2004

(54) MULTI-BLADED TAIL ROTOR HUB DESIGN FOR CORIOLIS RELIEF

(75) Inventors: Ajay Sehgal, Leonardtown, MD (US); Cecil Covington, deceased, late of Azle, TX (US), by Peggy Covington, legal representative; David Haynie, Euless, TX (US); Joseph Zierer, Fort Worth, TX (US); Eric Boyle, Haslet, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 191 days.

(21) Appl. No.: 10/090,359

(22) Filed: Mar. 4, 2002

(65) Prior Publication Data

US 2002/0136636 A1 Sep. 26, 2002

Related U.S. Application Data

(60) Provisional application No. 60/289,265, filed on May 7, 2001, and provisional application No. 60/273,534, filed on Mar. 6, 2001.

(51) Int. Cl.⁷ .............................................. B64C 27/35
(52) U.S. Cl. .................... 416/104; 416/134 A; 416/107
(58) Field of Search ............................ 416/107, 134 A, 416/104; 29/889.71

(56) References Cited

U.S. PATENT DOCUMENTS

| | | | |
|---|---|---|---|
| 3,700,351 A | 10/1972 | Flux ........................... | 416/123 |
| 3,784,319 A | 1/1974 | Amer et al. ................ | 416/135 |
| 3,790,302 A | 2/1974 | Pascher ...................... | 416/134 |
| 4,095,322 A | 6/1978 | Scarpati et al. ......... | 29/156.8 P |
| 4,098,559 A | 7/1978 | Price ........................... | 416/230 |
| 4,316,701 A | 2/1982 | Scarpati et al. ............. | 416/226 |
| 4,349,316 A | 9/1982 | Hughes et al. ............... | 416/104 |
| 4,466,773 A | 8/1984 | Pariani ...................... | 416/134 A |
| 4,522,563 A | 6/1985 | Reyes et al. ............. | 416/134 A |
| 4,881,874 A | 11/1989 | White et al. ................ | 416/138 |
| 5,041,182 A | 8/1991 | Sekiguchi et al. .......... | 156/245 |
| 5,222,297 A | 6/1993 | Graff et al. ............... | 29/889.71 |
| 5,277,548 A | 1/1994 | Klein et al. ............. | 416/193 A |
| 5,346,367 A | 9/1994 | Doolin et al. ............... | 416/230 |
| 5,645,400 A | 7/1997 | Hunter et al. ........... | 416/134 A |
| 5,860,807 A | 1/1999 | McFarland et al. ........... | 434/33 |

FOREIGN PATENT DOCUMENTS

GB 2122156 1/1984 ........... B64C/11/06

*Primary Examiner*—Edward K. Look
*Assistant Examiner*—Kimya N McCoy
(74) *Attorney, Agent, or Firm*—James E. Walton

(57) ABSTRACT

A multi-bladed tail rotor assembly is disclosed that provides higher aerodynamic performance, damage tolerant design with 10,000-hour life expectancy, and which requires low maintenance through the use of composites and elastomerics. The tail rotor hub assembly includes two stacked yoke assemblies having multi-bladed teetering rotors, each mounted on a single drive mast. Each yoke assembly includes a yoke hub having a transverse bore therethrough, a bearing assembly disposed within the bore, and retention means for aligning and securing the bearing assembly within the bore. Each bearing assembly includes a trunnion portion having trunnion arms that extend outwardly from a trunnion body portion, and an elastomeric bearing disposed about each trunnion arm. The tail rotor assembly utilizes a composite twist strap flexure to accommodate collective pitch control integral with each rotor blade.

21 Claims, 7 Drawing Sheets

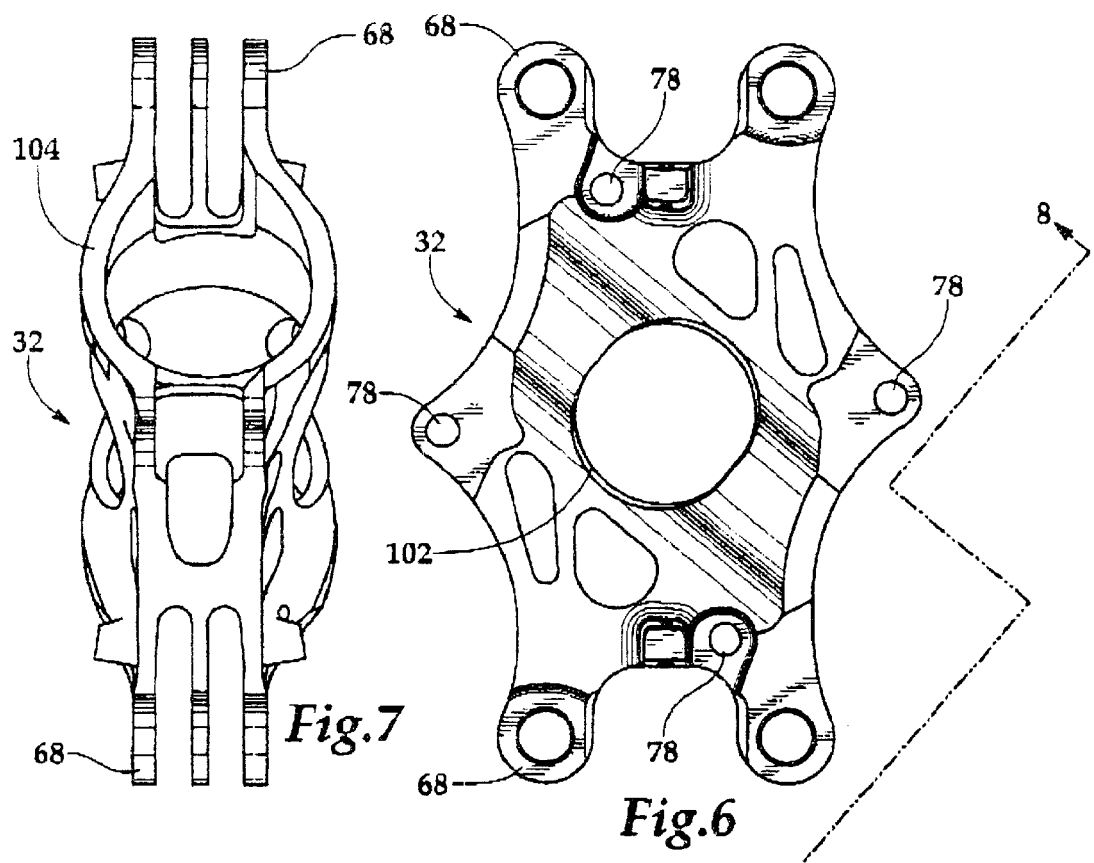
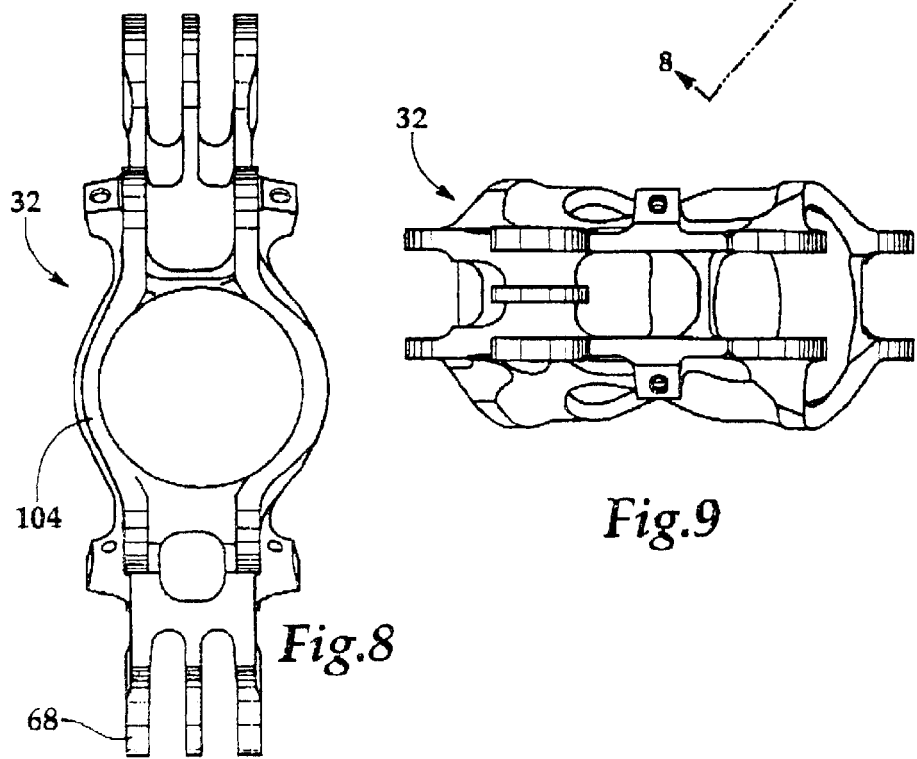
Fig.7
Fig.6
Fig.8
Fig.9

MULTI-BLADED TAIL ROTOR HUB DESIGN FOR CORIOLIS RELIEF

This application claims the benefit of U.S. Provisional Application No. 60/273,534, filed Mar. 6, 2001, titled "Four-Bladed Tail Rotor Hub Design for Coriolis Relief," and U.S. Provisional Application No. 60/289,265, filed May 7, 2001, titled "Elastomeric Bearing and Trunnion Rotor Hub Assembly."

GOVERNMENT LICENSE RIGHTS

The U.S. Government has a paid-up license in this invention and the right in limited circumstances to require the patent owner to license others on reasonable terms as provided for by the terms of Contract No. N00019-96-C-0128 awarded by NAVAIR.

BACKGROUND

1. Field of the Invention

The present invention relates to tail rotors for helicopters and other rotary wing aircraft. In particular, the present invention relates to a multi-bladed tail rotors and their ability to accommodate potentially powerful Coriolis torque.

2. Description of Related Art

One of the significant challenges involved with the design of multi-bladed tail rotors is their ability to accommodate potentially powerful Coriolis torque. When the rotor plane of a helicopter rotor is tilted relative to the shaft, 1/rev and 2/rev Coriolis torque is generated. Because the 1/rev Coriolis torque is proportional to the coning angle, it is usually negligible for most tail rotors. For two-bladed tail rotors, the 2/rev Coriolis is also not a problem because both blades speed up and slow down at the same time, and the drive system is usually sufficiently flexible to provide the necessary torsional freedom. However, the 2/rev Coriolis torque becomes a problem with multi-bladed tail rotors when no lead-lag articulation is provided.

Various methods are used on existing helicopters with multi-bladed tail rotors to provide the necessary relief for 2/rev Coriolis torque. For example: the Sikorsky S-56 uses a fully articulated rotor having lead-lag hinges and dampers; the Sikorsky S-61 has a flexible spindle at the blade root combined with restricted flapping motion to limit stresses due to Coriolis; the Kaman UH-2 allows a small amount of lead-lag motion by using a rocking pin arrangement in its flapping hinge; and the Lockheed AH-56 uses a gimbaled tail rotor hub that relieves the 2/rev Coriolis torque in the same manner as a two-bladed teetering rotor. Unfortunately, all of these approaches tend to be heavy and complex. They each require highly loaded bearings oscillating at tail rotor frequency. This results in a design that requires a lot of maintenance and a significant amount of downtime.

One of the ways to approach this problem is to mount two, two-bladed rotors on the same shaft. This arrangement provides a four-bladed tail rotor with the mechanical and structural simplicity of a two-bladed teetering rotor. By using this concept, no bearings are required to oscillate while carrying the full centrifugal force of the blade.

The AH-1Z/UH-1Y tail rotor also utilizes this approach, where two 2-bladed rotors are mounted on the same drive shaft. Each assembly is a two-bladed teetering rotor; they are independently mounted on a single output shaft. The span wise axes of the blade-pairs are perpendicular to each other, and are separated axially to provide adequate space for accommodating hub attachment hardware and operational clearance between them. However, this configuration does not inherently provide relief for the 2/rev Coriolis torque. Whenever the tail rotor experiences first harmonic flapping, one pair of blades is trying to speed up at the same instant in time that the other pair of blades is trying to slow down. Thus, the two rotors are trying to move like a pair of scissors.

This approach has been used on several research and production models throughout the rotorcraft industry. Bell Helicopter Textron Inc. has successfully flown a double-teetering tail rotor with coaxial shafts on one of its research aircraft. The AH-64D Apache uses a double-teetering tail rotor with flexible forks. While both these approaches provide the desired relief for 2/rev Coriolis torque, there are several disadvantages associated with each one: the mechanical complexity, heavier design, problems associated with tailoring stiffness of critical metal parts—possibly resulting in a degraded structural design and potentially catastrophic failure modes—just to name a few.

Although the foregoing approaches represent significant strides in the area of tail rotor design, significant challenges remain with regard to the ability of multi-bladed tail rotors to accommodate this potentially powerful Coriolis torque.

SUMMARY OF THE INVENTION

While various multi-bladed tail rotor designs presently in use compensate for Coriolis torque differently, the tail rotor system of the present invention offers a simpler and more cost-effective solution by making use of existing parts that are required to perform other functions.

There is a need for a multi-bladed tail rotor system that can accommodate potentially powerful Coriolis torque without the need for heavy, complex components, such as highly loaded bearings oscillating at tail rotor frequencies.

Therefore, it is an object of the present invention to provide a multi-bladed tail rotor system that can accommodate 2/rev Coriolis torque without the need for heavy, complex components that require significant maintenance and downtime.

This object is achieved by providing a four-bladed tail rotor system in which 2/rev Coriolis relief is provided by optimizing the dynamic characteristics of an existing component in the system, i.e., an elastomeric bearing that accommodates rotor flapping. The tail rotor system of the present invention utilizes two stacked two-bladed teetering rotors, each rotor pair being mounted onto the same single drive shaft through a unique rotor yoke assembly. The span wise axes of the two pairs of blades are perpendicular to each other and are separated axially to provide adequate space for accommodating hub attachment hardware and operational clearance. Each rotor yoke assembly is mounted to the drive shaft with a bearing and trunnion assembly in which a pair of trunnion arms having a generally conical shape extend radially outward from a cylindrical body portion.

The trunnion arms are preferably shaped to fit securely within an elastomeric bearing. The elastomeric bearings may be either molded to the trunnion arms or pre-molded and secured to the trunnion arms after molding. A rigid sleeve is disposed around each elastomeric bearing. These sleeves are configured to fit securely within a transverse bore that passes through each rotor yoke. The elastomeric bearings and sleeves are held in place within the yoke by retention fittings that are coupled to the rotor yokes at each end of the transverse bore. The sleeves may include stop members that are received by the retention fittings to limit the movement of the yoke relative to the drive shaft.

In the preferred embodiment of the present invention, an inboard bearing and trunnion assembly, a hub adapter, and an outboard bearing and trunnion assembly are coupled together on the drive shaft by an inboard cone, an outboard cone, and a mast nut. Drive torque is transferred from the drive shaft to the inboard bearing and trunnion assembly through splines on the exterior of the drive shaft which mate with splines on the interior of the body portion of the inboard bearing and trunnion assembly. The drive torque is transferred from the inboard bearing and trunnion assembly to the hub adapter through a toothed coupling on one end of the hub adapter, and from the hub adapter to the outboard bearing and trunnion assembly through another toothed coupling on the other end of the hub adapter.

The multi-bladed tail rotor system according to the present invention provides the significant advantages. Conventional teetering rotors that use elastomeric bearings to provide flapping degrees of freedom, require that the radial stiffness of the bearings to be very high to minimize radial deflection under rotor torque. However, in the multi-bladed tail rotor system according to the present invention, the radial stiffness of a uniquely designed elastomeric flapping bearing is tailored to provide adequate stiffness to react to rotor torque and to provide adequate softness to relieve the 2/rev Coriolis torque, without adding additional hardware. Because this Coriolis relief is provided by tailoring the spring rate of an existing component, the resulting hub assembly provides a much simpler configuration with reduced weight and cost, and higher reliability due to reduction in the number of parts in the system.

DESCRIPTION OF THE DRAWINGS

The novel features believed characteristic of the invention are set forth in the appended claims. However, the invention itself, as well as, a preferred mode of use, and further objectives and advantages thereof, will best be understood by reference to the following detailed description when read in conjunction with the accompanying drawings, wherein:

FIGS. 6 through 9 are principal axis views of one of the tail rotor yoke assemblies of the multi-bladed tail rotor hub assembly according to the present invention.

DETAILED DESCRIPTION OF THE PREFERRED EMBODIMENT

Figure 1:
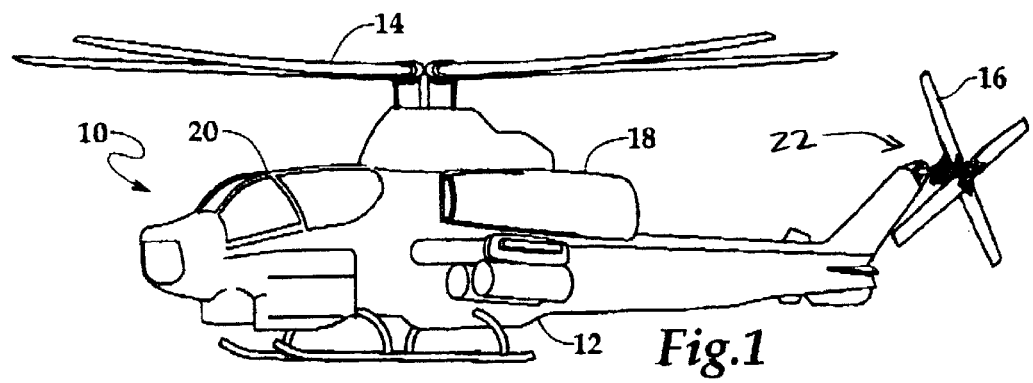
FIG. 1 is a perspective view of a helicopter having a multi-bladed tail rotor assembly according to the present invention.

Referring to FIG. 1 in the drawings, an aircraft 10 having a multi-bladed tail rotor hub assembly for Coriolis relief according to the present invention is illustrated. Aircraft 10 comprises a fuselage 12 and a main rotor 14. Torque imparted to fuselage 12 by main rotor 14 is counter-acted by a multi-bladed tail rotor assembly 16 mounted on a tail portion 22 of fuselage 12. Main rotor 14 and multi-bladed tail rotor assembly 16 are powered by a drive means 18 under the control of a pilot in a cockpit 20.

It will be noted that tail rotor assembly 16 of aircraft 10 is a "pusher" type design, wherein tail rotor assembly 16 is located on the left side of aircraft 10 looking forward. This design is desirable because in conventional "tractor" designs in which the tail rotor assembly is located on the right side of the aircraft, side loading of tail portion 22 caused by the tail rotor wake has been shown to subtract significantly from available tail rotor thrust. In certain instances, a net thrust loss due to the interference of tail portion 22 may be as high as twenty percent. For this reason, in the preferred embodiment of the present invention, tail rotor assembly 16 is located on the "pusher" side of tail portion 22. The fin-to-tail rotor separation distance has been optimized for weight, flapping clearance, and aerodynamic efficiency.

In the preferred embodiment of the present invention, multi-bladed tail rotor assembly 16 utilizes four rotor blades. The use of four blades provides lower blade loading, i.e., thrust per blade, as compared to two-blade designs. The use of four rotor blades results in improved aerodynamic performance due to lower tip losses associated with high aspect ratio blades. The use of four tail rotor blades also results in reduced control loads.

Figure 2:
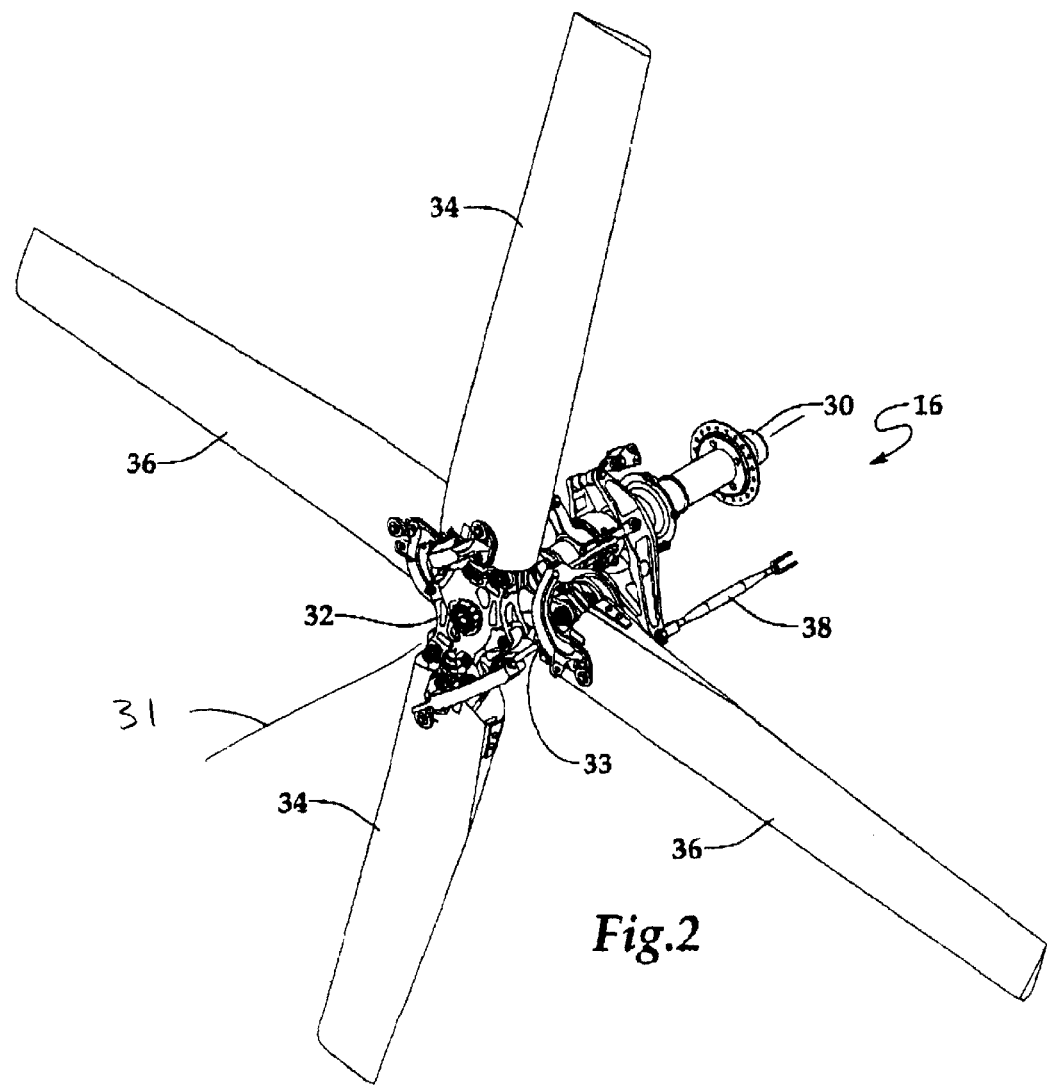
FIG. 2 is a perspective view of the multi-bladed tail rotor assembly according to the present invention.
Figure 3:
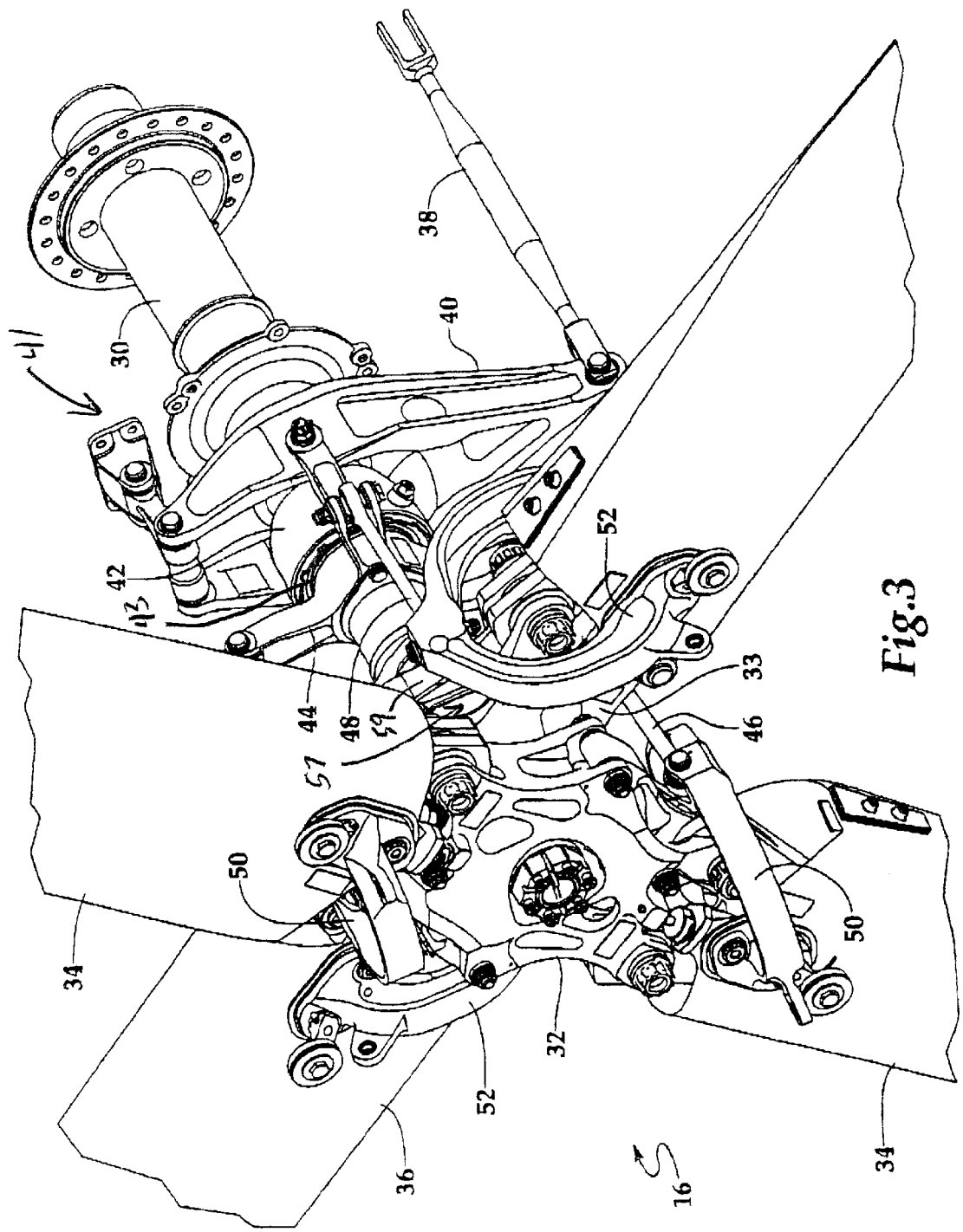
FIG. 3 is an enlarged perspective view of the multi-bladed tail rotor assembly of FIG. 2.
Figure 4:
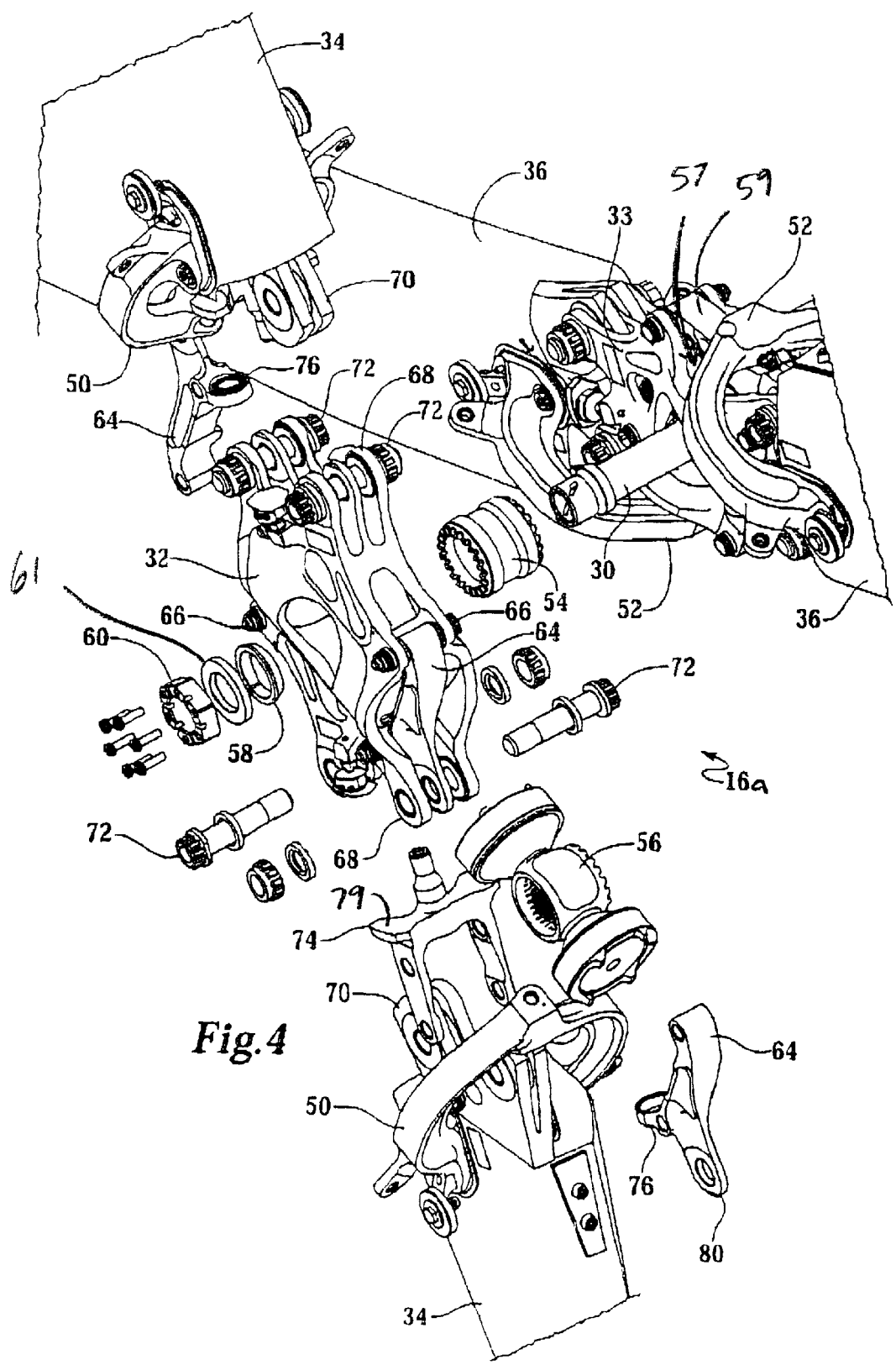
FIG. 4 is an exploded view of the multi-bladed tail rotor hub assembly of FIG. 3.

Referring now to FIGS. 2 through 4 in the drawings, tail rotor assembly 16 of aircraft 10 is illustrated in perspective views. FIG. 2 is an assembled view of tail rotor assembly 16, FIG. 3 is an enlarged assembled view of tail rotor assembly 16, and FIG. 4 is an exploded view of a tail rotor hub assembly 16a. Tail rotor hub assembly 16a includes a mast 30 having a mast axis 31 coupled to two virtually identical hub assemblies: an outboard hub assembly and an inboard hub assembly. The outboard hub assembly includes an outboard yoke 32, an outboard trunnion and elastomeric bearing assembly 56 carried within outboard yoke 32, and outboard retention fittings 64 coupled to the ends of outboard yoke 32. Two outboard blades 34 are coupled to outboard yoke 32, as will be described in detail below. Although not completely visible in the figures, the inboard hub assembly includes an inboard yoke 33, an inboard trunnion and elastomeric bearing assembly 57 carried within inboard yoke 33, and inboard retention fittings 59 coupled to the ends of inboard yoke 33. The outboard hub assembly is spatially separated from the inboard hub assembly by a hub adapter 54, as will be described in further detail below. As will be explained in more detail below, inboard hub assembly, outboard hub assembly, and hub adapter 54 are sandwiched together and held in place over mast 30 by an inboard cone 94 (see FIG. 5A), an outboard cone 58, a spacer 61, and a mast nut 60.

Outboard trunnion and elastomeric bearing assembly 56 is held in place within outboard yoke by retention fittings 64. Likewise, inboard trunnion and elastomeric bearing assembly 57 is held in place within inboard yoke 33 by retention fittings 59. Retention fittings 64 are coupled to outboard yoke 32 by bolts 66 that pass through bores 78 (see FIG. 6). Retention fittings 59 are coupled to inboard yoke 33 in a similar fashion. In the preferred embodiment, an additional lug 80 integral to retention fitting 64 provides one of the redundant load paths for the rotor blade to yoke attachment.

A rotating control system 41 is oriented generally coaxial with and on the outside of mast 30. Rotating control system 41 includes a rotating crosshead 44, a thrust bearing housing 42, a thrust bearing 43, an input lever 40, a plurality of pitch links 46 and 48, and a plurality of U-shaped pitch horns 50 and 52. Thrust bearing 43, along with a system of links and levers, provides an interface between a non-rotating control system and rotating control system 41. Rotating crosshead 44 controls blade pitch by transmitting control inputs from the non-rotating system through pitch links 46 and 48 to the cuff-mounted U-shaped pitch horns 50 and 52.

Tail rotor hub assembly 16a includes a plurality of shear spindles 74. Each shear spindle 74 is coupled to an inboard end of rotor blades 32 and 34 to provide a blade shear load path to a bearing 76 housed in a corresponding retention fitting 64. Each shear spindle 74 includes at least one coning stop 79 to limit blade coning. The coning stops 79 prevent damage from strong side gust winds and ground handling.

In the preferred embodiment, outboard yoke 32 and inboard yoke 33 each include a set of multiple redundant load paths. For clarity, these multiple redundant load paths will be described with respect to outboard yoke 32 only. It will be understood that multiple redundant load paths associated with outboard yoke 32 are also associated with inboard yoke 33. Yoke 32 includes multiple lugs 68 having redundant load paths at each end. Each pair of lugs 68 is configured to receive blade lugs 70 of rotor blade 34. Each rotor blade 34 is attached to lugs 68 of outboard yoke 32 with bolts 72 in a multiple shear connection. Rotor blades 34 are preferably separated by 180 degrees. In the preferred embodiment, outboard yoke 32 is configured inboard of lugs 68 such that multiple load paths for structural redundancy in reacting to blade-to-blade centrifugal forces is provided. It should be understood that yoke 32 and rotor blades 34 may be assembled in alternate geometries.

Figure 5A:
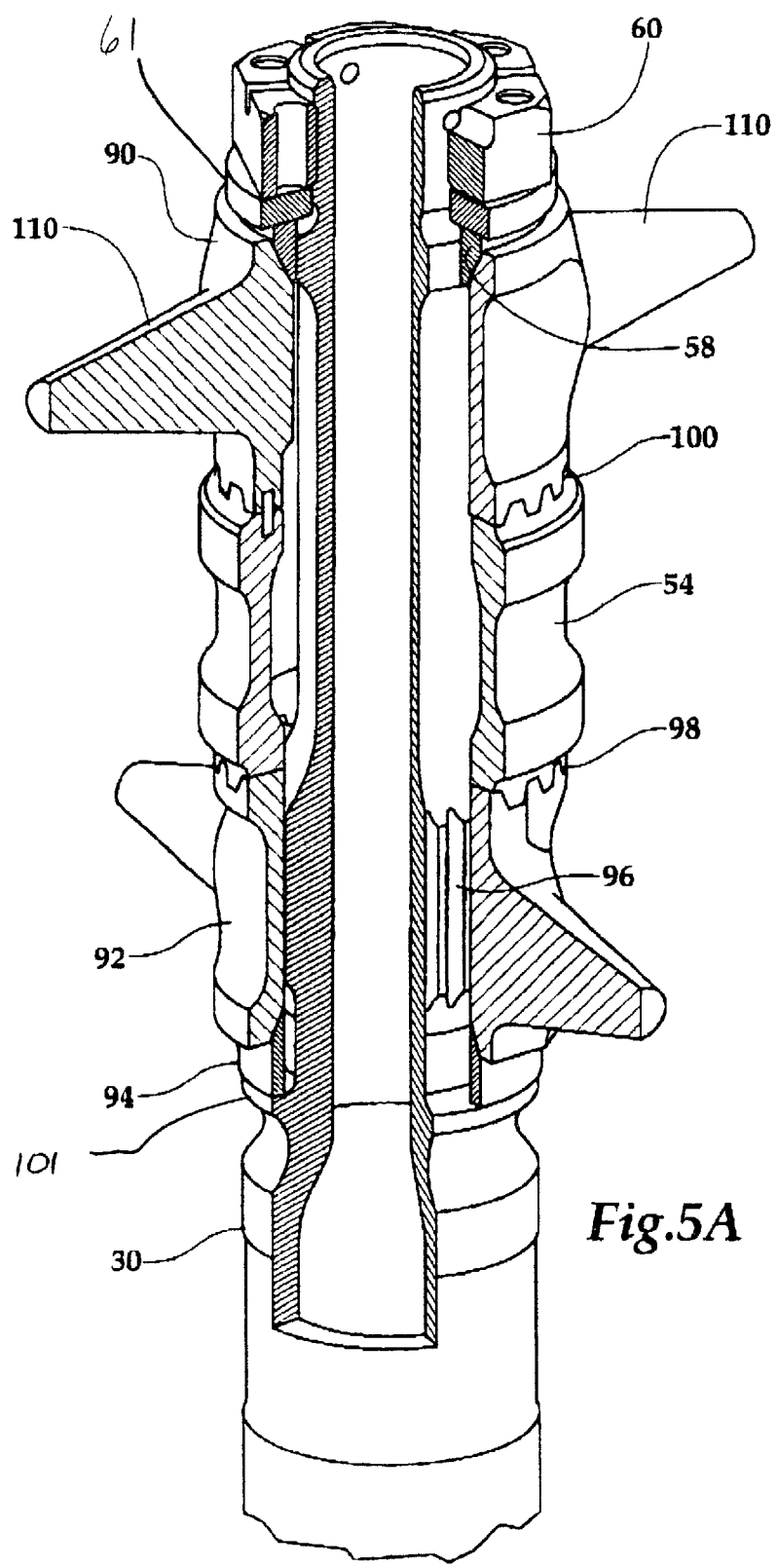
FIG. 5A is a cut-away view of the mast and trunnion assemblies of the multi-bladed tail rotor hub assembly according to the present invention.

Referring now to FIG. 5A in the drawings, the trunnion-to-mast attachment structure of tail rotor hub assembly 16a is illustrated. As is shown, an inboard cone 94, an inboard trunnion 92, hub adapter 54, an outboard trunnion 90, outboard cone 58, and spacer 61 are sandwiched together over mast 30 between an inboard shoulder 101 of mast 30 and mast nut 60. As mast nut 60 is tightened down onto mast 30, outboard trunnion 90, hub adapter 54, and inboard trunnion 92 are compressed together and positively centered. Inboard cone 94 blocks out radial looseness in the spline section 96, and outboard cone 58 provides positive centering of outboard trunnion 90. Mast 30 transmits drive torque to inboard trunnion 92 by means of a spline section 96 disposed on mast 30. Inboard trunnion 92 has mating splines on its inside surface that mate with spline section 96 of mast 30. Inboard trunnion 92 forms a toothed coupling 98 with hub adapter 54. The drive torque is transmitted from inboard trunnion 92 to hub adapter 54 through toothed coupling 98. Hub adapter 54 forms a toothed coupling 100 with outboard trunnion 90. The drive torque is transmitted from hub adapter 54 to outboard trunnion 90 through toothed coupling 100.

As is shown, a portion of mast 30 outboard of inboard trunnion 92 has a reduced outside diameter. This reduced outside diameter produces a torsional stiffness significantly lower than the tortional stiffness of hub adapter 54. Thus, for any rotational deflection of outboard trunnion 90, mast 30 will rotate an equivalent amount, but with the rotation occurring in the reduced-diameter section of mast 30, and not at the interface of outboard cone 58 and mast 30. Mast nut 60 produces an axial preload across inboard cone 94, inboard trunnion 92, hub adapter 54, outboard trunnion 90, outboard cone 58, and spacer 61. This axial preload generates a desirable frictional clamp up at outboard cone 58 and counteracts separation force from toothed couplings 98 and 100.

The primary purpose of hub adapter 54 is to transfer drive torque from inboard trunnion 92 to outboard trunnion 90. Because inboard trunnion 92 is splined to mast 30, all of the steady drive torque from mast 30 is transferred to inboard trunnion 92. However, only about one-half of that drive torque is transferred to rotor blades 36 through inboard yoke 33. The remaining drive torque is transferred from inboard trunnion 92, through hub adapter 54, through outboard trunnion 90, to rotor blades 34 through outboard yoke 32. It should be noted that because outboard trunnion 90 is not splined to mast 30, hub adapter 54 experiences about one-half of the mast torque as a steady load.

By configuring tail rotor hub assembly 16a in this manner, several benefits are provided, including: (1) reduced failure due to fretting and wear; (2) the absence of relative motion at the attachment joints; and (3) commonality between the inboard and outboard rotor assemblies. Because the 2/rev Coriolis torque loads between inboard trunnion 92 and outboard trunnion 90 are counteracted by toothed couplings 98 and 100, and not splined section 96 of mast 30, the potential failure due to fretting is reduced. Because the two stacked trunnions 90 and 92 are clamped together through toothed couplings 98 and 100, they are securely fixed to one another via a tight joint, which is desirable for minimizing the fretting and wear common to joints that see high oscillatory loads. The torsionally soft outboard section of mast 30 accommodates the angular deflection between inboard trunnion 92 and outboard trunnion 90 with minimal relative motion occurring at the toothed joints of toothed couplings 98 and 100. In addition, this unique configuration allows for common inboard and outboard rotor assemblies that can be assembled, replaced, and shipped as individual two-bladed assemblies. The configuration of toothed couplings 98 and 100 of hub adapter 54 include important design considerations. First, each toothed coupling 98 and 100 must be capable of counteracting the steady, oscillatory, and limit torque loads imposed by tail rotor hub assembly 16a. Second, it is desirable that the axial preload across toothed couplings 98 and 100 be sufficient to prevent joint separation during operation. Toothed couplings 98 and 100, along with the surrounding hardware, must also be capable of carrying the preload requirement. Therefore, it should be understood that the size and pitch of toothed couplings 98 and 100 may vary from one application to another.

Figure 5B:
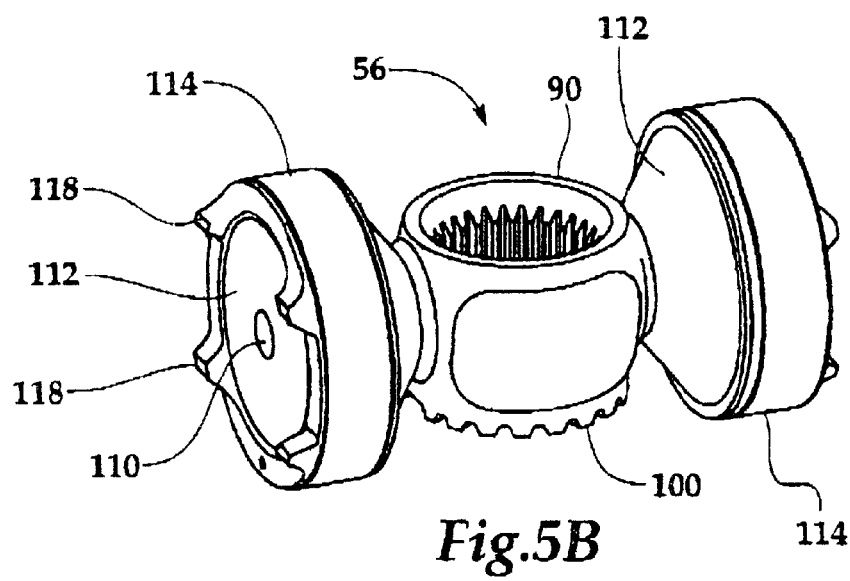
FIG. 5B is a perspective view of one of the bearing and trunnion assemblies of the multi-bladed tail rotor hub assembly according to the present invention.
Figure 5C:
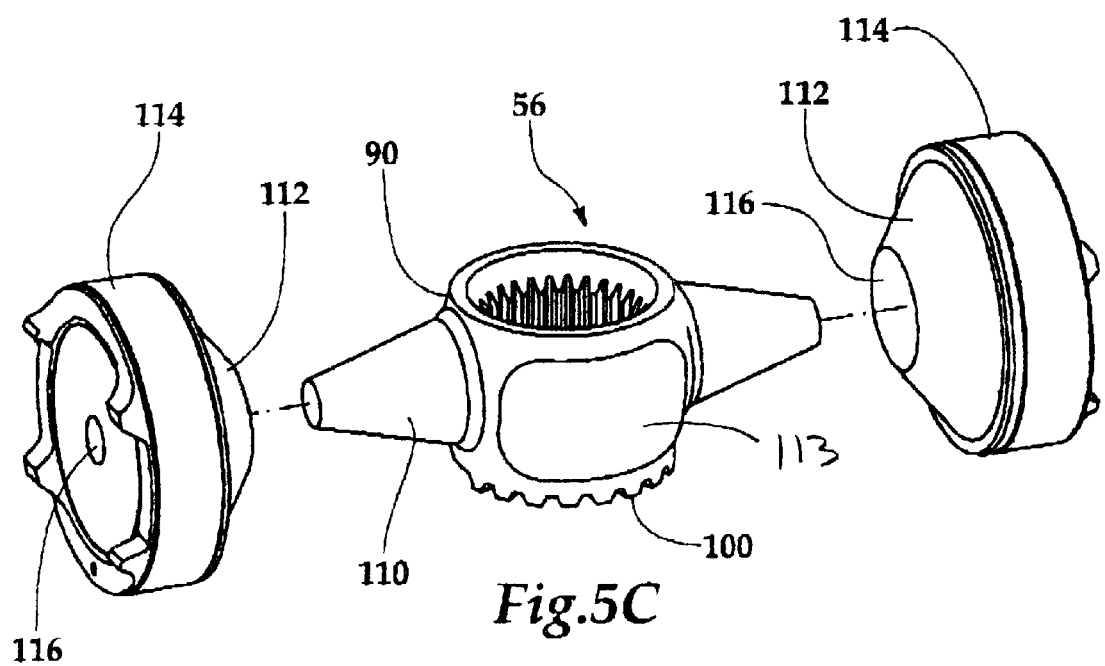
FIG. 5C is an exploded view of the bearing and trunnion assembly of FIG. 5B.

Referring now to FIGS. 5B and 5C in the drawings, elastomeric bearing and trunnion assembly 56 is illustrated. In FIG. 5B, bearing and trunnion assembly 56 is shown in an assembled view; while in FIG. 5C, bearing and trunnion assembly 56 is shown in an exploded view. Bearing and trunnion assembly 56 includes a trunnion 90 having a pair of trunnion arms 110 extending radially outward therefrom. In the preferred embodiment, trunnion arms 110 have a generally conical shape in which they taper inwardly as they extend outwardly from a body portion 113. Each trunnion arm 110 is configured to fit securely within an interior portion 116 of an elastomeric bearing 112. Elastomeric bearings 112 accommodate rotor flapping motions and forces, and each elastomeric bearing and trunnion assembly 56 and 57 provides load paths for rotor torque and thrust. A rigid annular sleeve 114 is disposed around each elastomeric bearing 112. Sleeves 114 are configured to fit securely within a transverse bore 104 (see FIGS. 6 through 9) through inboard yoke 33 and outboard yoke 32. In the preferred embodiment, sleeves 114 include stops 118 that register against retention fittings 64 to limit the radial movement of sleeves 114 within bore 104. In this manner, the movements of inboard yoke 33 and outboard yoke 32 relative to mast 30 are limited.

As set forth above, the 2/rev Coriolis relief provided by the present invention is achieved by optimizing the spring rate characteristics of elastomeric bearings 112, rather than by adding additional hardware. Conventional teetering rotors that use elastomeric bearings to provide a flapping degree of freedom allow the radial stiffness of the bearings to be very high in order to minimize weight and size. However, according to the present invention, the radial stiffness of elastomeric bearings 112 is selectively tailored to provide adequate stiffness to react to rotor torque, while at the same time providing adequate softness to relieve the 2/rev Coriolis loads. Because the Coriolis relief is provided by tailoring the spring rate of an existing component, the resulting hub assembly provides a much simpler configuration with reduced weight and cost, and higher reliability due to reduction in the number of parts required.

In the preferred embodiment, trunnion 90 is made of stainless steel; however, it will be understood that other suitable materials may be used. Likewise, it should be understood that the construction materials and dynamic characteristics of elastomeric bearings 112 may vary from one application to another. In the preferred embodiment, elastomeric bearings 112 are molded and placed, or vulcanized, directly onto trunnion arms 110. It should be understood, that elastomeric bearings 112 may also be pre-molded and then later bonded to, adhered to, or otherwise secured to, trunnion arms 110 after molding. In the preferred embodiment, elastomeric bearings 112 are selectively tailored to provide an axial spring rate in a direction parallel to the axis of the trunnion arms; a flapping spring rate; and a radial, or torque, spring rate radially about the axis of the mast to relieve the 2/rev Coriolis torque. It should be noted that any one of these characteristics may vary depending upon the requirements of a particular application.

Tail rotor hub assembly 16a provides far superior performance as compared to conventional tail rotor hub assemblies, particularly in regard to the handling of 2/rev Coriolis torque. In general, the known solutions for dealing with 2/rev Coriolis torque involve heavy and complex mechanisms. Some require the use of highly loaded bearings oscillating at tail rotor frequencies, resulting in designs that require high levels of maintenance and excessive down times. In certain conventional designs, problems associated with tailoring the stiffness of critical metal parts exist, which can result in degraded structural designs and potentially catastrophic failure modes. However, tail rotor hub assembly 16a according to the present invention overcomes these problems.

The 2/rev Coriolis torque relief of tail rotor hub assembly 16a is provided by optimizing the spring rate characteristics of elastomeric bearings 112, which are existing components in multi-bladed tail rotor system. In other words, tail rotor hub assembly 16a uses an existing elastomeric bearing used to accommodate rotor flapping, rather than introducing a separate mechanism. Conventional teetering rotors that use elastomeric bearings to provide flapping degrees of freedom allow the radial stiffness of the bearings to be very high in order to minimize weight and size. In the present invention, however, the bearing radial stiffness is tailored to provide adequate stiffness to react rotor torque and to provide adequate softness to relieve 2/rev Coriolis torque loads.

Because the Coriolis torque relief is provided by tailoring the spring rate of an existing component necessary to accommodate the flapping degrees of freedom, the resulting hub assembly provides a much simpler configuration, having reduced weight and costs, and providing higher reliability due to a reduction in the number of parts required to achieve that result. Certain parts of multi-bladed tail rotor hub assembly 16a according to the present invention may be designed to function as independent fail safe load paths to protect against catastrophic failure of the tail rotor hub assembly 16a. For example, certain embodiments of tail rotor hub assembly 16a incorporate redundant load paths in the lug areas of outboard yoke 32 and inboard yoke 33. Specifically, outboard yoke 32 and inboard yoke 33 are designed to allow each lug 68 to function independently of the other lugs 68 as a fail safe load path. With this configuration, even in the event of a complete mechanical failure of one of the lugs 68, the other lug 68 can continue to carry loads.

Referring now to FIGS. 6 through 9 in the drawings, outboard yoke 32 is illustrated in four principal-axis views. It will be appreciated that outboard yoke 32 is identical in form and function as inboard yoke 33. Outboard yoke 32 transfers drive torque to rotor blades 34, reacts to rotor loads, and transfers blade thrust to mast 30 through elastomeric bearing and trunnion assembly 56. In the preferred embodiment, outboard yoke 32 and inboard yoke 33 are forged from titanium.

Mast 30 passes through a mast bore 102. A bearing bore 104, which intercepts mast bore 102 and is indexed to a pitch axis, receives elastomeric bearing and trunnion assembly 56. In the preferred embodiment, bearing bore 104 is indexed at forty degrees to the pitch change axis. When fully assembled, retention fittings 64 are coupled to yoke 32 at each end of bearing bore 104, such that a compressive axial preload is created across elastomeric bearing and trunnion assembly 56. As is best seen in FIG. 4, retention fitting 64 is held in place by two bolts 66 that pass through bores 78.

In the preferred embodiment, there are six independent primary load paths. In the event of failure of any of these load paths, outboard yoke 32 will continue to provide a high level of structural integrity to tail rotor hub assembly 16a. For example, if tail rotor hub assembly 16a suffers complete failure of any single load path, tail rotor hub assembly 16a can maintain structural integrity for at least six flight hours of an unrestricted flight spectrum, including all limit and ultimate load conditions.

Figure 10:
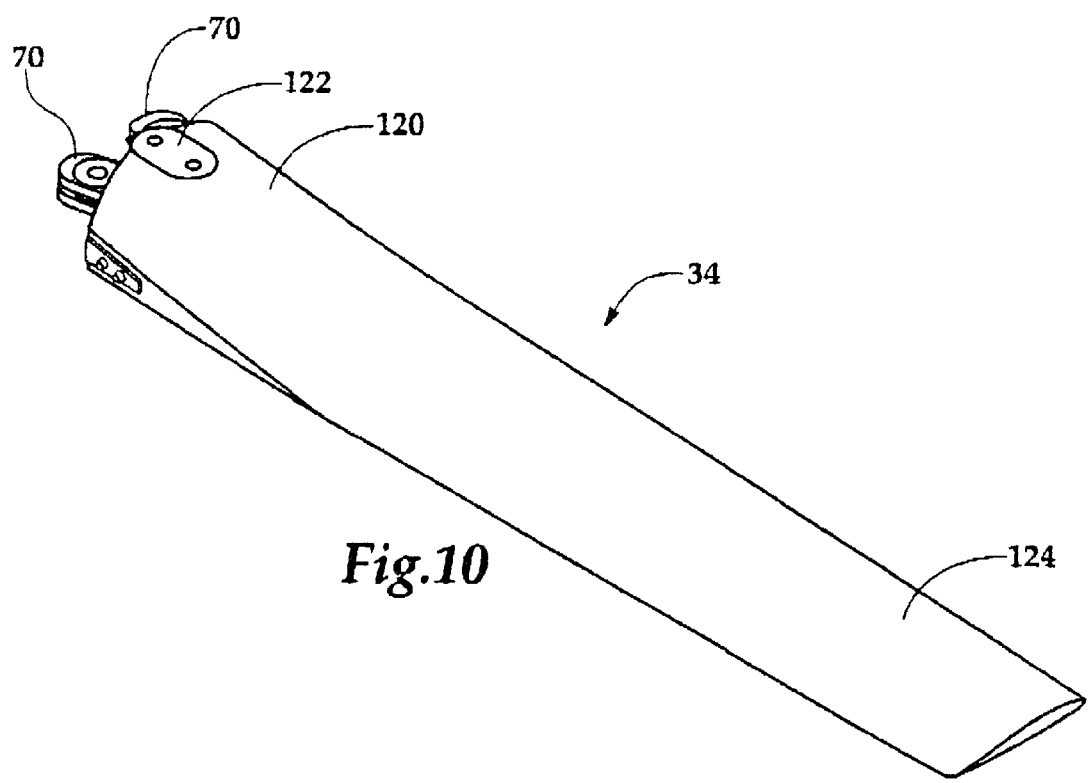
FIG. 10 is a perspective view of a rotor blade of the multi-bladed tail rotor assembly according to the present invention.
Figure 11:
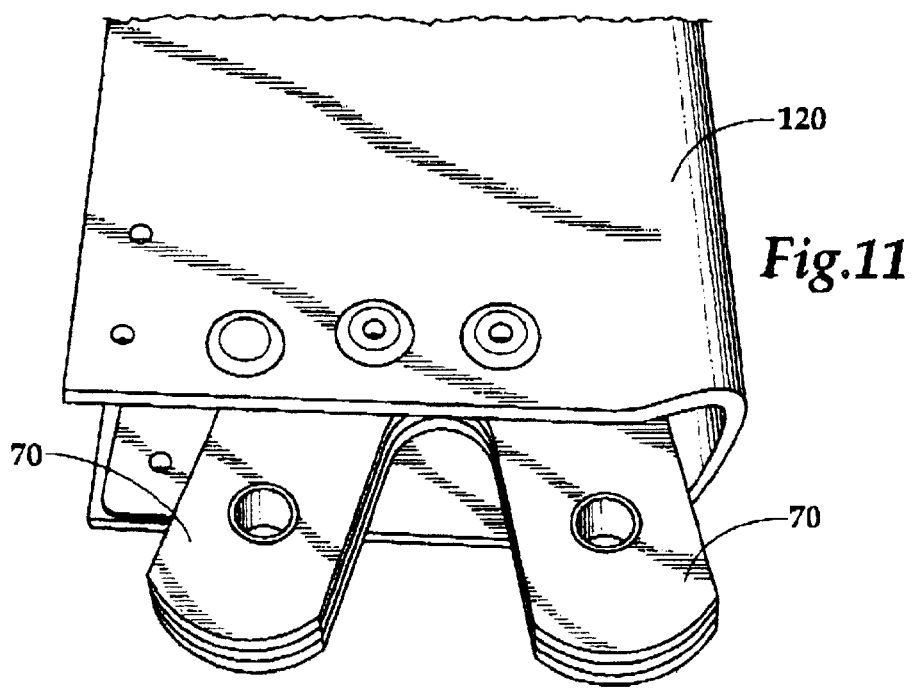
FIG. 11 is an enlarged perspective view of the rotor blade cuff of the rotor blade of FIG. 10.

Referring to FIG. 10 in the drawings, a rotor blade 34 according to the present invention is illustrated. In the preferred embodiment, rotor blade 34 includes three distinct portions: an integral cuff 120, an outboard blade section 124, and an integral twist strap (not shown). The integral twist strap within cuff 120 functions as the main centrifugal force load path for rotor blade 34, and accommodates both pitch change and coning motions. The integral twist strap is rigidly bolted to yoke lugs 68 through blade lugs 70. Integral cuffs 120, which are coupled to the upper and lower surfaces of rotor blade 34 at interfaces 122, interface with outboard yoke 32 through shear spindles 74. Integral cuffs 120 deliver control system pitch inputs to rotor blades 34 via U-shaped pitch horns 50. U-shaped pitch horns 50 are also coupled to cuffs 120. Outboard blade section 124 generates an aerodynamic thrust for rotor blade 34. Although tail rotor hub assembly 16a has been described herein with respect to four rotor blades, it should be understood that tail rotor hub assembly 16a may utilize more or fewer than four rotor blades.

In the preferred embodiment, cuff section 120 of rotor blade 34 has a hollow airfoil shape. It is preferred that cuff 120 be manufactured primarily from off-axis fiberglass/epoxy tape in combination with several unidirectional layers of carbon fiber. Of course, it should be understood that other forms of construction and choices of materials may be utilized for rotor blade 34.

An inside opening of cuff 120 is large enough to accommodate the pitch change motion of the twist strap. Cuff 120 interfaces with rotor yoke 32 through shear spindle 74, which is bolted to the upper and lower surfaces of rotor blade 34, and delivers control system pitch inputs to rotor blade 34 through U-shaped pitch horn 50. As set forth above, the outboard end of cuff 120 is integral with rotor blade 34.

In addition to the above-described distinctions, the multi-bladed tail rotor system according to the present invention may utilize a bearingless pitch mechanism to accommodate rotor pitch. Conventional rotor assemblies differ from that of the subject invention in that conventional rotor assemblies rely on spherical bearings between the yokes and the blades to accommodate the pitching motion of the blades relative to the yoke. As best seen in FIGS. 2–4, rotor blades 34 and 36 are coupled to yokes 32 and 33, respectively, and in turn couple to mast 30, with no provision within tail rotor hub assembly 16*a* for accommodation of rotor blade pitch. Each rotor blade 34 and 36 incorporates an integral flexing strap that replaces the functionality of the bearings found in conventional designs by flexing about the lengthwise axis of each rotor blade 34 and 36, so as to allow for adjustment of the pitch of each rotor blade 34 and 36 without spherical bearings.

Inboard cuff 120 is configured to provide protection over the integral twist strap, thereby maintaining the aerodynamic contour of rotor blade 34 and preventing contact between the integral strap and the hollow structure of rotor blade 34 during flight. In the preferred embodiment, cuff 120 is configured to be sufficiently torsionally stiff to function as the pitching mechanism transmitting pitching torque from pitch horn 50 into rotor blade 34.

It is apparent that an invention with significant advantages has been described and illustrated. Although the present invention is shown in a limited number of forms, it is not limited to just these forms, but is amenable to various changes and modifications without departing from the spirit thereof.

We claim:

1. A rotor craft comprising:
   a fuselage;
   a drive means carried by the fuselage;
   a main rotor assembly coupled to the drive means; and
   a tail rotor assembly comprising:
      a mast coupled to the drive means;
      a bearing assembly coupled to the mast comprising:
         a trunnion portion having trunnion arms that extend outwardly from a trunnion body portion; and
         an elastomeric bearing disposed about each trunnion arm;
      a yoke having a bore therethrough to receive the bearing assembly; and
      a plurality of rotor blades coupled to the yoke;
   wherein the elastomeric bearing is tailored to have a selected axial stiffness, a selected flapping softness, and a selected radial stiffness to relieve 2/rev Coriolis torque.

2. The rotor craft according to claim 1, wherein the bearing assembly further comprises:
   a rigid annular sleeve disposed about each elastomeric bearing; and
   alignment means operably associated with each rigid annular sleeve for aligning the bearing assembly relative to the yoke.

3. The rotor craft according to claim 1, wherein the trunnion arms are substantially conical in shape.

4. The rotor craft according to claim 1, wherein the bearing assembly further comprises:
   a second bearing assembly disposed about the mast, the second bearing assembly comprising:
      a trunnion portion having trunnion arms that extend outwardly from a trunnion body portion; and
      an elastomeric bearing disposed about each trunnion arm;
   a second yoke having a bore therethrough to receive the second bearing assembly;
   a second plurality of rotor blades coupled to the second yoke; and
   a hub adapter disposed between and coupled to both the bearing assembly and the second bearing assembly.

5. The rotor craft according to claim 1, wherein the spring rate of the elastomeric bearing is selectively tailored to accommodate rotor flapping motions and forces and to provide relief from Coriolis torque.

6. The rotor craft according to claim 5, wherein the elastomeric bearing provides an axial spring rate in a direction parallel to the axis of the trunnion arms, a flapping spring rate, and a radial spring rate radially about the axis of the mast for relieving 2/rev Coriolis torque.

7. A rotor craft comprising:
   a fuselage;
   a drive means carried by the fuselage;
   a main rotor assembly coupled to the drive means; and
   a tail rotor assembly comprising:
      a mast coupled to the drive means;
      a bearing assembly coupled to the mast comprising;
         a trunnion portion having trunnion arms that extend outwardly from a trunnion body portion; and
         an elastomeric bearing disposed about each trunnion arm;
      a yoke having a bore therethrough to receive the bearing assembly; and
      a plurality of rotor blades coupled to the yoke;
   wherein the elastomeric bearings are molded directly onto the trunnion arms.

8. A rotor craft comprising:
   a fuselage;
   a drive means carried by the fuselage;
   a main rotor assembly coupled to the drive means; and
   a tail rotor assembly comprising:
      a mast coupled to the drive means;
      a bearing assembly coupled to the mast comprising;
         a trunnion portion having trunnion arms that extend outwardly from a trunnion body portion; and
         an elastomeric bearing disposed about each trunnion arm;
      a yoke having a bore therethrough to receive the bearing assembly; and
   a plurality of rotor blades coupled to the yoke;
   wherein the elastomeric bearings are pre-molded prior to coupling to the trunnion arms.

9. A tail rotor assembly for a rotor craft comprising:
   a drive mast;
   an inboard yoke assembly coupled to the drive mast;
   a plurality of rotor blades coupled to the inboard yoke assembly;
   an outboard yoke assembly coupled to the inboard yoke assembly; and a plurality of rotor blades coupled to the outboard yoke assembly;

the inboard yoke assembly and the outboard yoke assembly each comprising:

a yoke hub having a transverse bore therethrough;

a bearing assembly disposed within the bore comprising:

a trunnion portion having trunnion arms that extend outwardly from a trunnion body portion; and p3 an elastomeric bearing disposed about each trunnion arm; and retention means for aligning and securing the bearing assembly within the bore.

10. The tail rotor assembly according to claim 9, wherein each bearing assembly further comprises:

a rigid annular sleeve disposed about each elastomeric bearing; and alignment means operably associated with each retention means.

11. The tail rotor assembly according to claim 9, wherein the trunnion arms are conical in shape.

12. The tail rotor assembly according to claim 9, further comprising:

a hub adapter disposed between and coupled to both the bearing assembly of the inboard yoke assembly and the bearing assembly of the outboard yoke assembly.

13. The tail rotor assembly according to claim 9, wherein the spring rate of each elastomeric bearing is selected to accommodate rotor flapping motions and forces and to provide relief from Coriolis torque.

14. The tail rotor assembly according to claim 13, wherein each elastomeric bearing provides an axial spring rate in a direction parallel to the axis of the trunnion arms, a flapping spring rate, and a radial spring rate radially about the axis of the mast for 2/rev Coriolis relief.

15. The tail rotor assembly according to claim 13, wherein the elastomeric bearing is tailored to have a selected axial stiffness, a selected flapping softness, and a selected radial stiffness to relieve 2/rev Coriolis torque.

16. The tail rotor assembly according to claim 9, wherein the elastomeric bearings are molded directly onto the trunnion arms.

17. The tail rotor assembly according to claim 9, wherein the elastomeric bearings are pre-molded prior to attachment to the trunnion arms.

18. The tail rotor assembly according to claim 9, wherein each transverse bore is indexed at about forty degrees to the pitch change axis.

19. The tail rotor assembly according to claim 9, further comprising:

an inboard cone member disposed about the mast; and an outboard cone member disposed about the mast;

wherein the inboard yoke assembly and the outboard yoke assembly are sandwiched between and positively centered about the mast by the inboard cone and the outboard cone.

20. The tail rotor assembly according to claim 9, further comprising:

a splined coupling between the mast and the trunnion body portion of the trunnion portion of the bearing assembly of the inboard yoke assembly;

whereby the drive torque of the drive mast is transferred from the drive mast to the inboard yoke assembly.

21. A method of relieving 2/rev Coriolis torque in a tail rotor assembly of a rotor craft, the method comprising the steps of:

providing a drive mast;

coupling a first trunnion assembly having first elastomeric bearings to the drive mast;

disposing a first yoke assembly having a hub portion and plurality of rotor blades about the first trunnion assembly and first elastomeric bearings;

coupling a hub adapter to the first trunnion and elastomeric bearing assembly;

coupling a second trunnion assembly having second elastomeric bearings to the hub adapter;

disposing a second yoke assembly having a hub portion and plurality of rotor blades about the second trunnion assembly and second elastomeric bearings;

selectively configuring the first and second elastomeric bearings to relieve the 2/rev Coriolis torque in the tail rotor assembly of the rotor craft.

* * * * *